April 2, 1963 L. H. FICK 3,083,743

LEAD COMBING APPARATUS

Filed Oct. 16, 1961 2 Sheets-Sheet 1

INVENTOR
L.H.FICK

BY W. A. Johnson
ATTORNEY

April 2, 1963 L. H. FICK 3,083,743

LEAD COMBING APPARATUS

Filed Oct. 16, 1961 2 Sheets-Sheet 2

INVENTOR
L.H.FICK
BY
ATTORNEY 3,083,743
Patented Apr. 2, 1963

3,083,743

LEAD COMBING APPARATUS

Lawrence H. Fick, Reading, Pa., assignor to Western Electric Company, Incorporated, New York, N.Y., a corporation of New York Filed Oct. 16, 1961, Ser. No. 145,289
5 Claims. (Cl. 140—147)

The invention relates to lead combing apparatus, particularly apparatus for combing leads extending in groups from electrical components.

Various types of components, after being completed structurally, must be tested and, in some instances, subjected to numerous tests to determine their efficiency and electrical characteristics prior to being mounted in electrical units of which they are to be a part. Many of these components are small and difficult to handle, particularly in the positioning of their leads for inclusion in predetermined circuits of test sets. It is important, therefore, that the leads of the components be straight and in their respective known spaced positions prior to moving the components relative to the test sets.

The object of the present inventionis an apparatus which is simple in structure yet highly efficient in combing leads of components.

According to the object, the invention comprises an apparatus for combing leads extending in groups from components comprising a holder for a component having a group of leads extending therefrom, a roller recessed to receive the component and having grooves in the periphery of the roller closely positioned at entrance ends to receive the leads adjacent the component and extending in predetermined directions to straighten the leads and space them given distances from each other, and means to rotate the roller.

Other objects and advantages will be apparent from the following detailed description when considered in conjunction with the accompanying drawings wherein.

Figure 1:
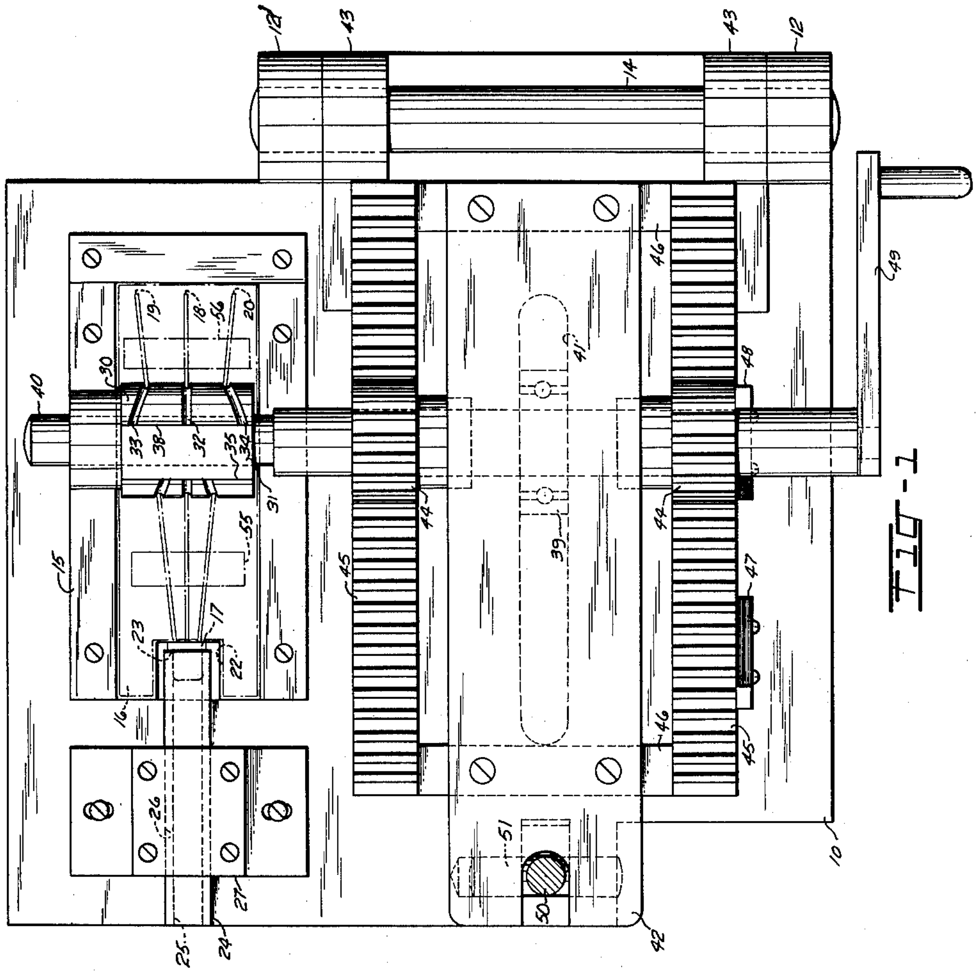
FIG. 1 is a top plan view of the apparatus.

The apparatus has a base 10 mounted on a suitable support, such as a bench 11, and having vertically extending bearing members 12 disposed in alignment to receive and support the ends of a pivot bar 14. A nest 15 is mounted on the base 10 and is substantially U-shaped in general contour to removably receive a card 16 upon which a component 17 is to be mounted. The component 17, in the present instance, has a group of leads extending from one end thereof including a central lead 18 and side leads 19 and 20. During the manufacture of the component, the leads 18, 19, and 20 are caused to extend from known positions at one end of the component and the leads are caused to be of sufficient lengths to include them in various test circuits. The card 16 which, in the present instance, is formed of vulcanized fibers, has an aperture or notch 22 in one end thereof to receive the component and provided with an inner surface 23 against which the component is held during combing of the leads.

A holder 24 is provided with a longitudinally extending aperture 25 which is round in cross-section to receive a component in the end thereof. The holder is externally square in cross-section for sliding movement on the base 10 and through a guideway 26 of a guide 27 mounted on the base.

Figure 3:
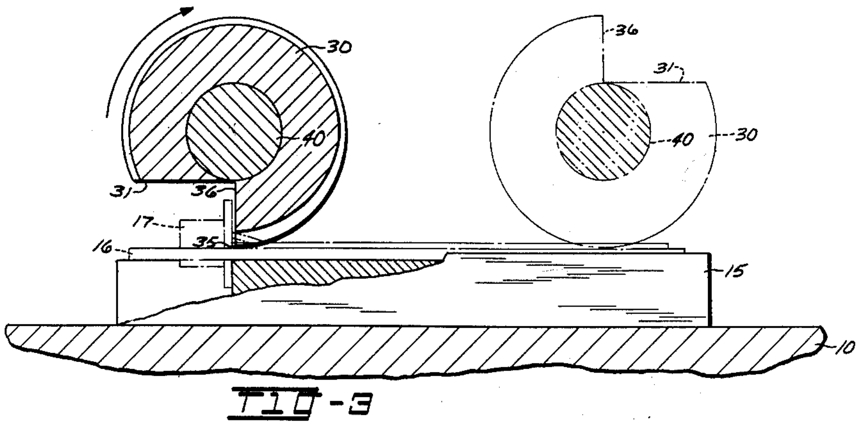
FIG. 3 is a vertical sectional view of the roller shown in its starting position.

A roller 30, longitudinally notched at 31 to receive the component when the roller is in its starting position, as shown in FIG. 3, is provided with a series of grooves 32, 33, and 34. The grooves 32, 33, and 34 are disposed closely adjacent each other at a starting edge 35 of the roller, an edge where a surface 36 meets the periphery of the roller, these starting positions of the grooves corresponding to the positions of their respective leads 18, 19, and 20 adjacent the component 17. It will be observed that the groove 32, in the present instance, does not vary its position longitudinally of the roller from the starting edge to a finishing edge 38. However, the grooves 33 and 34 move outwardly toward their respective ends of the roller so that during rotation of the roller from the starting position, shown in FIG. 3, to the finishing position, shown in FIG. 1, the leads 19 and 20 will be moved like distances away from each other and also like distances away from the central lead 18.

The roller 30 is fixedly mounted on a shaft 40 which is held for rotary and lateral movement in a bearing 39, the outer portion of which is movable in a groove 41 of an element 42 which has members 43 fixed thereto and supported by the pivot bar 14. Pinions 44 are fixedly mounted on the shaft 40 and interengage their respective racks 45, the ends of which are fixed to vertical members 46 of the element 42. Actually, the shaft 40 is supported by the racks. Starting and finishing stops 47 and 48 are adjustably mounted on one of the racks 45 and are positioned in the path of the shaft 40 to determine lateral movement of the shaft and to particularly locate the roller 30 in its starting position. Suitable means, such as a hand crank 49, is mounted on the shaft 40 to rotate it, to move the shaft through each operating cycle, and to return the shaft to its starting position.

In the present instance, the element 42 with its associated mechanism, is held in closed position by a clamp 50 pivotally supported at 51 on the base 10 and adapted to be moved into and out of position by action of a wing-nut 52 on a threaded end of the clamp.

*Operation*

Figure 2:
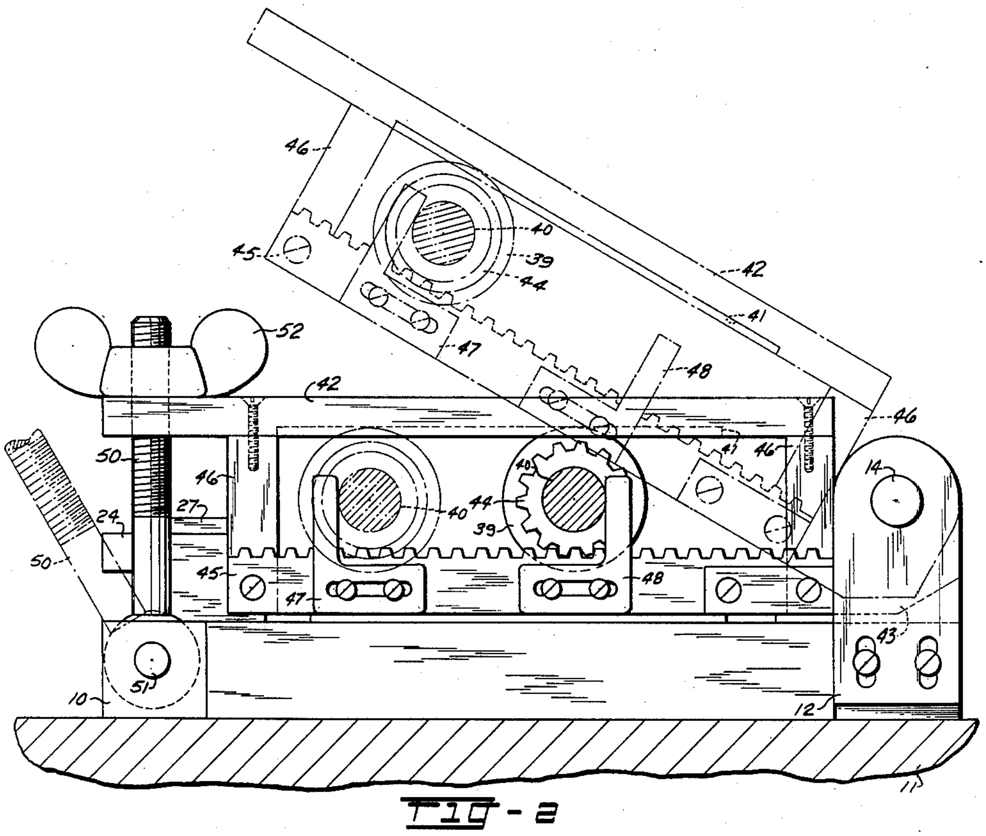
FIG. 2 is a front elevational view of the apparatus shown in solid lines in closed position and in broken lines in open position.

Prior to beginning the operating cycle of the apparatus, it must be in open position, as illustrated in broken lines in FIG. 2, so that a card 16 may be located in the nest 15, a component 17 located in the holder 24 and moved as far as possible to the right to locate the component against the surface 23 in the aperture 22 of the card. At this time, with the assurance that the shaft 40 is positioned against the stop 47, the apparatus may be closed and secured in closed position by the clamp 50.

When the apparatus is closed with the roller 30 at its starting position, as shown in FIG. 3, the surface 36 will be moved in close engagement with the end of the component from which the leads 18, 19, and 20 extend. The portion of the roller between the surface 36 and the adjacent periphery of the roller has somewhat of a wedge-shaped contour and with the entrance ends of the grooves 32, 33, and 34 positioned accurately at their starting edge 35, according to the known positions of the starting ends of the leads from the component, the leads will be caused to enter their respective grooves and the roller will rest on the card 16.

The driving action imparted to the roller 30 is such that during rotation of the shaft 40, through the aid of its drive means 49, the roller is caused to roll on the card, receiving this action through the rotation of the pinions 44 on their racks 45 and, as a result, the center lead 18 will be caused to be straightened while the other two leads 19 and 20 will also be caused to be straightened and moved away from each other and away from the center lead known distances. Here the leads will be held until suitable tapes 55 and 56 are placed over the leads and secured to the card 16. At this time, with the shaft 40 against the stop 48, the clamp 50 may be released and the apparatus opened moving the element 42 with the structure or features supported thereby, including the shaft 40, and the roller upwardly and away from the card. At this time, the component with its spaced leads is free to be removed with the card after movement of the holder 24 to the left.

With the apparatus open, another card may be disposed in the nest 16, another component inserted in the holder 24 and moved in position over the card, the shaft returned to its starting position against the stop 47, and the apparatus closed for the next operating cycle.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for combing leads extending in groups at known spaced positions from like ends of components comprising:
- a nest having a surface extending in a given plane from a starting position,
- a holder for a component,
- means to locate the holder with said end of the component held thereby disposed at the starting position,
- a roller having an axis parallel with and extending transversely of the surface of the nest,
- a starting edge of the roller extending longitudinally thereof, disposed adjacent a longitudinal recess which extends inwardly toward the axis a distance sufficient to position the roller clear of the component when the starting edge is disposed adjacent the starting position,
- the roller having grooves in its periphery extending from said starting edge, at the known spaced positions of the leads to receive their respective leads at the starting edge, in directions so that through the cooperation of said surface of the nest during rotation of the roller the leads in the grooves will be located in the nest in known straight positions relative to each other, and
- means to rotate the roller relative to the nest.

2. An apparatus for combing leads according to claim 1 in which:
- the means to rotate the roller includes a rotatable shaft fixed to and adapted to support the roller, and
- means responsive to the rotation of the shaft with the roller to move the shaft laterally to effect a rolling action of the roller relative to the surface of the nest and the leads.

3. An apparatus for combing leads according to claim 1 in which:
- the means to rotate the roller includes a shaft fixed to and adapted to support the roller,
- a pinion mounted on the shaft,
- a rack mounted at a fixed position adjacent the nest to support the shaft and interengage the pinion so that rotation of the shaft will cause simultaneous lateral movement of the shaft to impart a rolling action to the roller relative to the surface of the nest and leads.

4. An apparatus for combing leads extending in groups at known spaced positions from like ends of components comprising:
- a base,
- a nest mounted on the base and having a surface extending in a given plane from a starting position to removably support cards for the components singly,
- a holder for a component,
- means to locate the holder adjacent the nest with the component adjacent the starting position and the group of leads of the component disposed over the card on the nest,
- an element pivotally supported on the base adjacent the nest and movable about its pivot between an open position and an operating position,
- parallel racks spaced from each other and supported by the element,
- axially aligned pinions supported by and interengaging their respective racks,
- a rotatable shaft extending axially through the pinions and fixed thereto,
- a roller mounted on the shaft and adapted to extend transversely of the nest when the element is in the operating position,
- a starting edge of the roller extending longitudinally thereof, disposed adjacent a longitudinal recess which extends inwardly toward the axis of the roller a distance sufficient to position the roller clear of the component when the starting edge is disposed adjacent the starting position of the nest,
- the roller having grooves in its periphery extending from said starting edge, at the known spaced positions of the leads to receive their respective leads at the starting edge, in directions so that through the cooperation of the card held on said surface of the nest during rotation of the roller with the shaft and rolling movement of the roller on the card caused by the pinions and the racks, the grooves will cause increased spacing of the leads to known spaced positions.

5. An apparatus for combing leads according to claim 4 in which:
- stops are mounted at fixed spaced positions on the element at opposing sides of the shaft to locate the shaft and the roller in their respective starting and finishing positions.

References Cited in the file of this patent

UNITED STATES PATENTS

| | | |
|---|---|---|
| 1,289,259 | Porath | Dec. 31, 1918 |
| 3,002,539 | Rus | Oct. 3, 1961 |

FOREIGN PATENTS

| | | |
|---|---|---|
| 601,897 | Canada | July 19, 1960 |